US007005849B2

(12) United States Patent
Tse et al.

(10) Patent No.: US 7,005,849 B2
(45) Date of Patent: Feb. 28, 2006

(54) SYSTEM AND METHOD FOR HIGH-SPEED MASSIVE MAGNETIC IMAGING ON A SPIN-STAND

(75) Inventors: Chun Tse, Beltsville, MD (US); Charles S. Krafft, Owings Mills, MD (US); Isaak D. Mayergoyz, Rockville, MD (US); Dragos I. Mircea, College Park, MD (US)

(73) Assignee: University of Maryland, College Park, MD (US)

( * ) Notice: Subject to any disclaimer, the term of this patent is extended or adjusted under 35 U.S.C. 154(b) by 273 days.

(21) Appl. No.: 10/697,300

(22) Filed: Oct. 31, 2003

(65) Prior Publication Data

US 2004/0095134 A1 May 20, 2004

Related U.S. Application Data

(60) Provisional application No. 60/423,004, filed on Nov. 1, 2002.

(51) Int. Cl.
*G01R 33/12* (2006.01)
*G11B 5/596* (2006.01)
*G11B 27/36* (2006.01)

(52) U.S. Cl. ................ 324/212; 360/77.04; 360/77.06; 360/31

(58) Field of Classification Search ................ 324/212; 360/77.04, 77.06, 31

See application file for complete search history.

(56) References Cited

U.S. PATENT DOCUMENTS 6,061,201 A * 5/2000 Woods .................... 360/77.06
6,400,519 B1 * 6/2002 Mukoyama .................. 360/31
2003/0053235 A1 * 3/2003 Kikugawa et al. ............ 360/31

OTHER PUBLICATIONS

I. Mayergozy, et al., "Magnetic Imaging on a Spin-Stand", Journal of Applied Physics, vol. 87, No. 9, pp. 6824-6826, May 1, 2000.

I. Mayergoyz, et al., "Spin-Stand Imaging of Overwritten Data and Its Comparison with Magnetic Force Microscopy", Journal of Applied Physics, vol. 89, No. 11, pp. 6772-6774, Jun. 1, 2001.

(Continued)

*Primary Examiner*—Edward Lefkowitz
*Assistant Examiner*—David M Schindler
(74) *Attorney, Agent, or Firm*—Rosenberg, Klein & Lee

(57) ABSTRACT

A system (10) and method for high-speed massive magnetic imaging on a spin-stand (12) is provided. The system (10) includes a spin-stand system (12) for driving a rotational spindle (20) to which a magnetic hard disk (30) is mounted. A magnetic read head (40) reads data from disk (30) and is in electrical communication with a universal head preamplification board (50). The universal head preamplification board (50) outputs readable voltage signals which are transmitted to an oscilloscope (60) for displaying a read-back voltage display (70). The signals are processed by a processing means (90) to generate scanned image data (100) on a display means. The display signals (70) are utilized to calibrate the magnetically read data to account for the eccentricity of the hard disks with respect to the center of rotation of the spin-stand spindle. Whole tracks of hard disk data can be imaged through the process of "track-centering" and "track-following". An alignment algorithm is used to align the magnetically read data to compensate for the instability of the triggering signal.

21 Claims, 6 Drawing Sheets

OTHER PUBLICATIONS

I. Mayergoyz, et al., "Spin-Stand Imaging of Transverse Magnetization Profiles of Recorded Tracks", Journal of Applied Physics, vol. 89, No. 11, pp. 6775-6777, Jun. 1, 2001.

C. Tse, et al., "Spatial and Vectorial Characterization of Thermal Relaxation Using the Spin-Stand Imaging Technique", Journal of Applied Physics, vol. 91, No. 10, pp. 8846-8848, May 15, 2002.

* cited by examiner

● = READING TRACK CENTER (RTC)

⊕ = WRITTTEN TRACK CENTER (WTC)

SYSTEM AND METHOD FOR HIGH-SPEED MASSIVE MAGNETIC IMAGING ON A SPIN-STAND

REFERENCE TO RELATED APPLICATIONS

The subject Utility Patent Application is based on Provisional Patent Application No. 60/423,004 filed on 1 Nov. 2002.

This invention was made with Government support under Contract No. MDA90401C0904 awarded by the National Sercurity Agency. The Government has certain rights in the invention.

BACKGROUND OF THE INVENTION

1. Field of the Invention

The subject invention relates to a system and method for high-speed massive magnetic imaging on a spin-stand. In particular, the present invention directs itself to a magnetic hard disk rotatably mounted on a spin-stand system with a magnetic read head being further mounted on the spin-stand system to read data from the magnetic hard disk. Particularly, this invention directs itself to an orthogonal scanning of the magnetic hard disk to obtain a two-dimensional image of the magnetic data. More particularly, this invention directs itself to a method of "track-centering" and "track-following" to account for eccentricity of the hard disk with respect to the center of rotation of the spin-stand spindle to which the magnetic hard disk is mounted. Moreover, this invention directs itself to a technique of whole-track imaging of magnetic hard disks that are off-centered with respect to the center of rotation of the spin-stand spindle. Further, this invention is directed to a processor means for receiving, interpreting, translating, and storing data measured by the magnetic read head.

Additionally, this invention is directed to a method for establishing alignment of the magnetically read data. More particularly, the method for establishing alignment of the magnetically read data is based upon an alignment algorithm controlled by the processor means.

2. Prior Art

The imaging of magnetization patterns recorded on hard disk drives is a valuable tool which can appreciably aid future progress in the design of recording systems. Magnetic imaging is commonly performed using magnetic force microscopy (MFM). However, magnetic force microscopy has intrinsic limitations such as a low rate of image acquisition, a limited imaging area, special requirements for preparation of the sample to be imaged, and the virtual impracticality of numerous accumulations of images of the same target area to increase the signal-to-noise ratio.

Utilizing the system and method for high-speed massive magnetic imaging, raw image acquisition is performed by scanning a selected (target) area of a hard drive disk by a conventional magneto-resistive (MR) read head. This scanning is performed in two orthogonal (along-track and cross-track) directions. Scanning in the along-track direction is realized due to the rotation of the disk, while scanning in the cross-track direction is performed by using small and accurately controlled radial displacements of the head. This method for scanning has the following advantages over conventional MFM imaging: the image acquisition is performed under similar conditions as in commercial hard disk drives; there is a high rate of image acquisition; there is a vast imaging area; and numerous images of the same target area can be quickly accumulated in order to increase the signal-to-noise ratio.

SUMMARY OF THE INVENTION

The present invention provides for a system and method for high-speed massive magnetic imaging on a spin-stand. The system includes a spin-stand system for driving a rotatable spindle. A magnetic hard disk is rotatably mounted on the spindle and a magnetic read head is further mounted on the spin-stand system for reading magnetic data stored on the magnetic hard disk. The magnetic read head is in electrical communication with an oscilloscope and the oscilloscope displays read-back voltage data generated by the magnetic read head. The read-back voltage is displayed via the means of triggering on the drive index of the spin-stand spindle. The read-back voltage data displayed is used for calibrating the magnetically read data during the procedures of "track-centering" and "track-following" to account for eccentricity of the hard disk with respect to the center of rotation of the spindle.

Further, a processing means receives, translates, and stores the data measured and transmitted by the magnetic read head. The processor means further implements an algorithm for establishing alignment of the magnetically read data.

It is a principal objective of the subject composite system and method for high-speed massive magnetic imaging on a spin-stand to provide a magnetic hard disk rotatably mounted on a spin-stand system.

It is a further objective of the subject invention to provide a magnetic read head for reading magnetically stored data from the magnetic hard disk.

It is a further objective of the subject invention to provide an oscilloscope for receiving data generated by the magnetic read head and displaying the data as a read-back voltage display.

It is a further objective of the subject invention to provide a triggering signal generated by the drive index of the spindle to provide for triggering of the data.

It is a further objective of the subject system and method for high-speed massive magnetic imaging on a spin-stand to provide a method for calibrating the magnetically read data during the procedures of "track-centering" and "track-following" to account for eccentricity of the hard disk with respect to the center of rotation of the spindle.

It is a further objective of the subject system and method to provide a method for whole-track spin-stand imaging of hard disks that are off-centered with respect to the center of rotation of the spin-stand spindle.

It is a further objective of the subject invention to provide a processor means for receiving, translating, interpreting, storing, and displaying data generated by the magnetic read head.

It is an important objective of the subject system and method for high-speed massive magnetic imaging on a spin-stand to provide an algorithm implemented by the processor means for establishing alignment of the magnetically read data.

DESCRIPTION OF THE PREFERRED EMBODIMENTS

I. Overview

Figure 1:
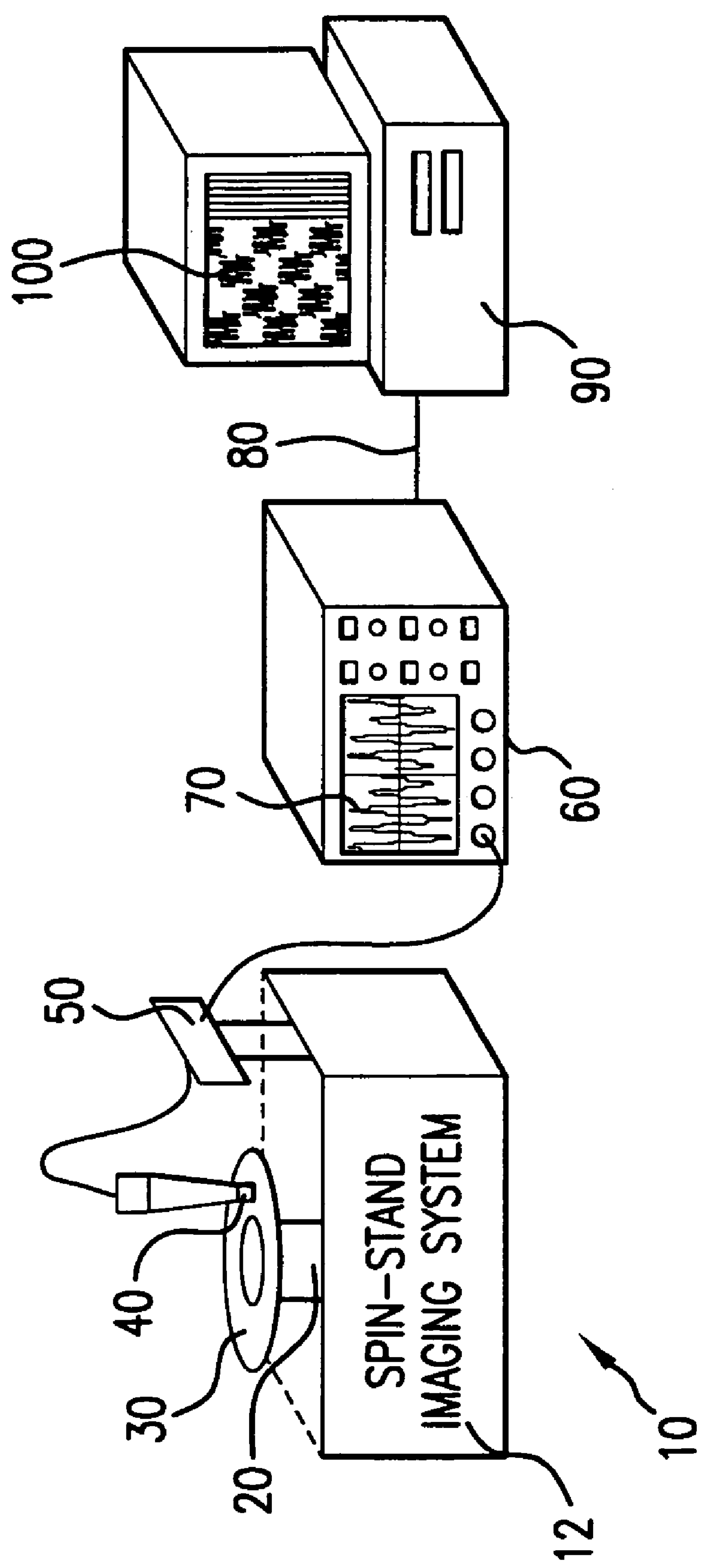
FIG. 1 is a schematic diagram of the subject system for high-speed massive magnetic imaging on a spin-stand.

Referring now to FIG. 1, there is shown a system 10 for high-speed massive magnetic imaging on a spin-stand. In general, the spin-stand imaging system 10 comprises a spin-stand system 12, an oscilloscope 60, and a computer or other processing means 90. The system 10 provides for the two-dimensional imaging of data stored on a magnetic hard disk 30 with a minimum of distortion and errors.

As shown in FIG. 1, the hard disk 30 is a standard magnetic hard disk having a plurality of magnetic tracks formed thereon, as is well-known in the art. The disk 30 is mounted on a rotating spindle 20 of the spin-stand system 12. The spin-stand system 12 is a rotational drive system for rotating disk 30 during the magnetic image scanning process.

The magnetic head 40 is mounted on the spin-stand system 12 and scans the individual tracks of the disk 30. Head 40 is in electrical communication with a universal head pre-amplification board 50 which is mounted on the spin-stand system 12.

The universal head pre-amplification board 50 of the spin-stand 12 is in electrical communication with an oscilloscope 60. The universal head pre-amplification board 50 outputs electrical signals representing the data that head 40 reads from disk 30. Oscilloscope 60 displays these signals as a function of voltage produced by the universal head pre-amplification board 50. The read-back voltage display 70 is observed on the screen of the oscilloscope 60. The oscilloscope 60 is in electrical communication with a computer or other processing means 90 via cable 80. The computer 90 translates the electrical signals generated by the head 40 and universal head pre-amplification board 50 into readable data. The readable data, in the form of scanned images, is shown on computer display means 100.

Image acquisition is performed by scanning a target area of the hard disk 30 with head 40, which may be a giant magnetoresistive (GMR) head, which are well-known in the art. The GMR head 40 scans in both the circumferential, or along-track, direction as well as the radial, or cross-track, direction. Scanning in the along-track direction is performed during the rotation of the disk, while scanning in the cross-track direction is achieved using small and accurately controlled radial displacements of the head 40. Since the target area on the disk 30 rotates at a relatively high speed, the spin-stand imaging technique requires highly accurate methods of triggering the signals in order to always image the same target area on the disk 30. Due to the high-speed scanning mechanism of the spin-stand imaging technique, numerous images of magnetic data can be rapidly accumulated in order to increase the signal-to-noise ratio. This is because while the deterministic magnetic data signal is proportional to N, the number of scanned images, the noise in the signal (which is uncorrelated or weakly correlated) is proportional only to the square root of N. In this way, the spin-stand imaging technique has the ability to image weakly magnetized data by accumulating numerous images of these data in the same target area.

The spin-stand imaging system 10 must be calibrated in order to take into account the eccentricity of the disk 30 with respect to the center of rotation of spindle 20. The techniques of "track-centering" and "track-following" allow for the imaging of the whole tracks of hard disks that are off-centered with respect to the center of rotation of the spin-stand spindle. When imaged, the hard disk data obtained in the presence of eccentricity will show individual tracks skewed by an angle caused by eccentricity. This angular skewing or deviation is generally very small in a standard hard disk drive, however, this small eccentricity may still cause the head to cross multiple tracks in one revolution of reading.

The track eccentricity, however, can be measured and accounted for by recording the skew or deviation angles as a function of read-back voltage 70 on the screen of the oscilloscope 60. In a typical hard disk, the user data is typically written circumferentially with blank regions, or guard bands, formed between individual tracks. The servo gain patterns are written radially extending from the innermost to the outermost track without any guard band. Thus, in the presence of a positive track skew angle, the guard bands as seen on the oscilloscope 60 will move or shift from the left side of the servo gain patterns to the right side as the user steps the head 40 toward the center of disk 30. Conversely, this movement will be from right to left in the case of a negative track skew angle.

The eccentricity can be measured and accounted for both before scanning and after scanning. In the pre-scanning stage, the eccentricity can be accounted for by mechanically adjusting the pressure of the mounting means for securing the disk 30 on spindle 20. The mounting means may be a pair of set screws or other typical securing means, for example, which mount the disk 30 on spindle 20. The pressure of the set screws on the disk 30 is adjusted until the guard bands as seen on the oscilloscope 60 cease to move or shift horizontally as the user steps the head 40 in the cross-track or radial direction.

In the post-scanning stage, any remnant eccentricity can be eliminated by numerically shifting the scanned image 70 in the opposite skew angle. The opposite skew angle, as described above, is determined through the observation of the servo gain patterns on the oscilloscope 60.

In the massive data imaging spin-stand system 10, the data derived from disk 30 must be gained in a non-destructive manner. This is accomplished by providing a stable trigger mechanism in order to always image the same target area of disk 30. A drive index is created which is incrementally updated with each complete revolution of spindle 20. The drive index of the spindle is used as an external trigger for oscilloscope 60. Due to mechanical variations of the rotational speed of the spindle motor contained within the spin-stand system 12, the drive index is not stable enough to produce a completely stable trigger means. Thus, a numerical aligning algorithm is utilized in order to offset any trigger-induced image shift.

In the alignment algorithm, successive along-track voltages are compared with adjacent along-track voltages in the cross-track direction. Specifically, cross-correlations between successive along-track voltages are computed. The along-track voltages are then shifted in the along-track direction by an amount such that the cross-correlation between successive along-track voltages achieves its maximum. It is important to note that this alignment algorithm is insensitive to the content or distribution of the data being aligned. In other words, the alignment for work regardless of whether the data are in the servo regions, track-id region, gain region, or the user-data region.

II. Whole-Track Spin-Stand Imaging from Off-Centered Disks: Techniques of "Track-Centering" and "Track Following"

Figure 2:
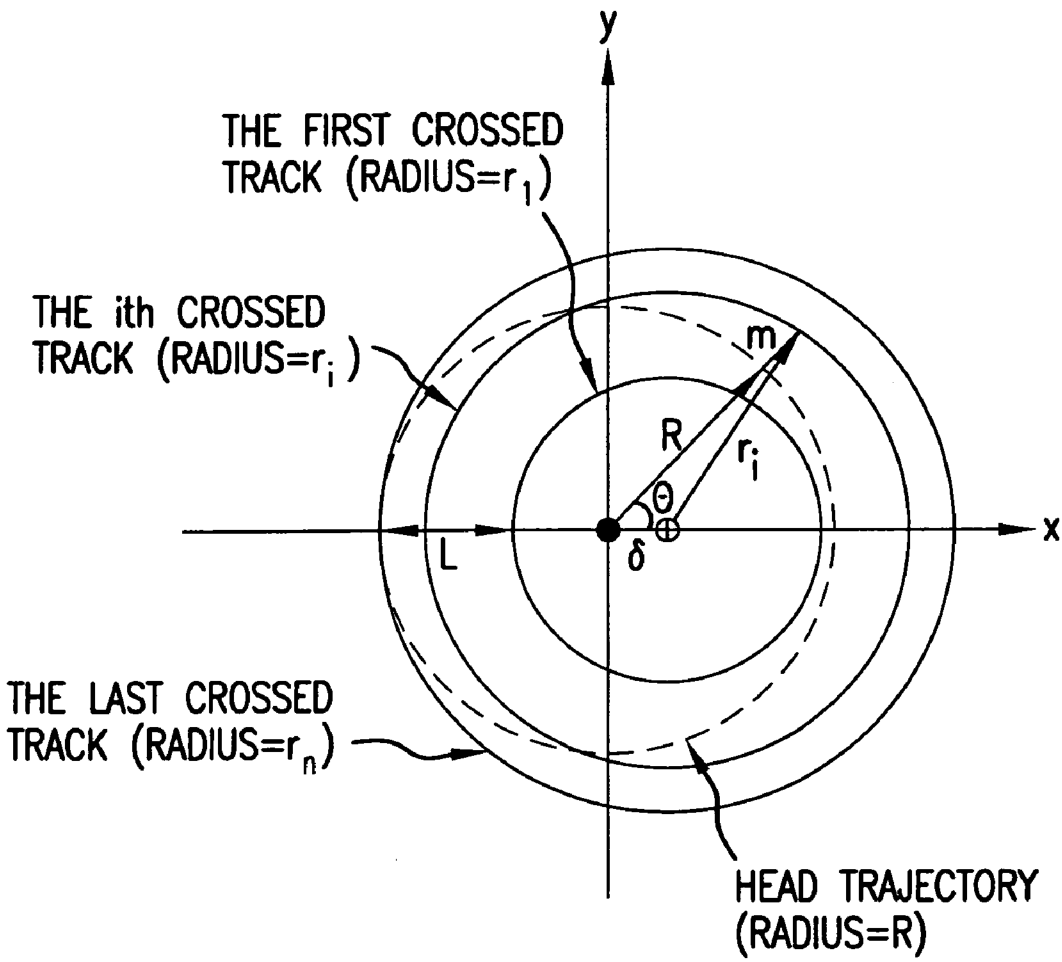
FIG. 2 shows the geometry of an off-centered disk on a spin-stand.

Whole-track spin-stand imaging involves the removing of a hard disk from its native drive and mounting it on a spin-stand. Due to the mechanical clearance tolerance between the spindle of the spin-stand and the inner rim of the hard disk platter, the disk once mounted on the spin-stand will not be centered with respect to the rotational center of the spindle. In order to facilitate subsequent discussion, it would be expedient at this point to introduce several terminologies about centering. The geometrical disk center (GDC) is the geometrical center of the hard disk platter being imaged. The reading track center (RTC) is defined to be the center of any circular path traced by the read head on the spin-stand (RTC is the same as the rotational center of the spin-stand spindle). The written track center (WTC) is defined as the center of the concentric tracks that have been written on the hard disk on its native drive. Since the GDC might not coincide with the rotational center of the spindle of the native drive, the WTC is usually different from the GDC and should be distinguished from it. The geometry of an off-centered disk on a spin-stand can be depicted in FIG. 2 where the spindle center is chosen to be the origin of the Cartesian coordinate system. In this figure, $\delta$ is the distance between the RTC and the WTC; R is the radius of the circular trajectory of the read head; $r_1$ is the radius of the first track being crossed; $r_i$ is the radius of the $i^{th}$ track being crossed; and $r_n$ is the radius of the $n^{th}$ track being crossed (i.e. the last crossed track). It should be noted that any track with radius smaller than $r_1$ or larger than $r_n$ will not be crossed. It is easy to observe that the total number of tracks being crossed, n, is L multiplied by the track density (TD) where L is $r_n - r_1$. Furthermore, the expression of L can be obtained by solving the following two simultaneous equations obtained through simple geometrical observations of FIG. 2:

$$R = \delta + r_1 \quad (1)$$

$$r_n = \delta + R \quad (2)$$

By adding the above equations, we have $$r_n - r_1 = L = 2\delta \quad (3)$$

Therefore, except around the innermost and the outermost track, the total number of tracks being crossed is independent of the radius of the read head trajectory and is a monotonic function of only two variables, $\delta$ and the track density TD. Specifically, $$n = L \cdot TD = 2\delta \cdot TD \quad (4)$$

Due to the continuous variation of the head skew angle across the surface of the disk, the value of the TD is meant to be the local track density value between the radii $r_1$ and $r_n$, not the averaged track density value specified in the data sheet of the hard drive.

In order to image the hard disk data of a whole track, for instance the track with radius $r_i$, it is first necessary to obtain the locus of this track in the presence of eccentricity. Assuming that the tracks are perfectly circular and taking into account that $\delta << r_i$, it is easy to derive from simple trigonometry the following equation for the curve of the imaged track based on FIG. 2:

$$m(\theta) \approx r + \delta \cos(\theta). \quad (5)$$

In the above equation, $m(\theta)$ is the curve of the imaged track with $\theta$ going from 0 to $2\pi$ for each complete revolution of the spindle, $r = r_i - R$ is the fixed part of m, and $\delta \cos(\theta)$ is the modulating part of m. In other words, the imaged track will be largely modulated as a sinusoidal function in the radial direction with a peak-to-peak amplitude of $2\delta$ and an angular frequency of that of the rotating spindle of the spin-stand.

There are two approaches for demodulating the tracks to be imaged. The first is one of "track-centering". The goal is to micro-position the disk so that its WTC coincides with the RTC of the spin-stand (or equivalently the spindle center). This is different from "disk-centering" where the goal is to match the GDC with the RTC. Track-centering is accomplished by systematically adjusting the pressure of the set screws that mount the disk platter onto the spindle. By studying the effects of the horizontal component of the pressure exerted by these set screws on the disk, the movement of the disk can be controlled well below 0.1 $\mu$m. The feedback of the effects of these adjustments during track-centering is provided by the oscilloscope whose time-base is set large enough to include the data of the whole track.

Figure 3:
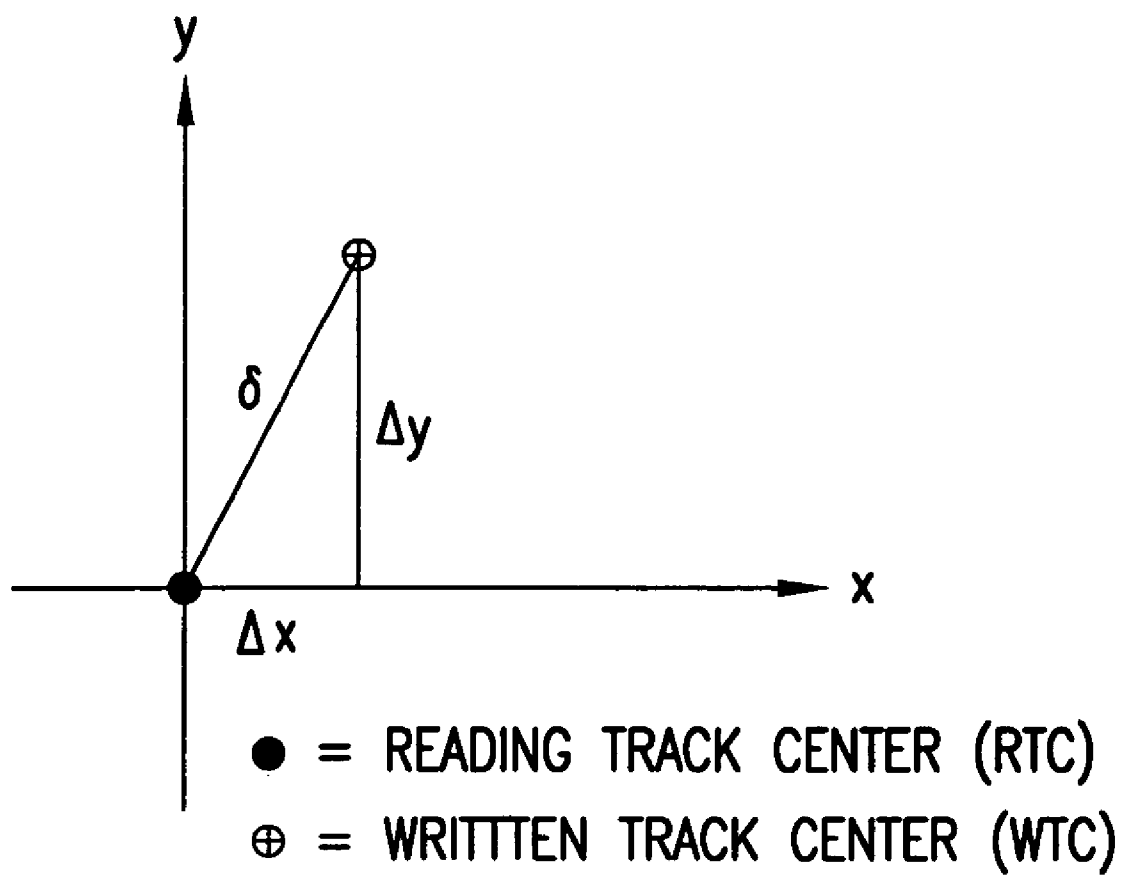
FIG. 3 shows the geometry of the orthogonal movements of an off-centered disk.

The central issue of track-centering is knowing which direction to move the disk in order to close the gap between the WTC and the RTC. Clearly, an algorithm other than the "trial and error" method is needed in order to center the tracks in a fast and accurate manner. We have devised an effective track-centering algorithm that takes advantage of the monotonic dependence of $\delta$ on n, the total number of tracks being crossed. At the heart of this algorithm is the successive movements of the disk in two orthogonal directions, as explained in FIG. 3. This figure depicts an off-centered disk with its WDC at a distance $\delta$ from the RDC of the spindle, which is chosen as the origin of the x-y coordinate system. From FIG. 2, $\delta$ can be expressed as:

$$\delta = \frac{n}{2 \cdot TD} = \sqrt{\Delta x^2 + \Delta y^2}. \quad (6)$$

It is evident that $\delta$ can be gradually reduced to zero if the disk is first moved in one direction (the x-direction) until n reaches a minimum, this position of the disk then corresponds to $\Delta x=0$. Next, the disk is moved in an orthogonal direction (the y-direction) until n is zero. At this new location $\Delta y$ will be zero as well. Hence, from equation (6), a zero $\delta$ (and thus a zero n) will be achieved when both $\Delta x$ and $\Delta y$ are zero. When the disk is properly track-centered, the amplitude of the whole-track data as seen on the scope will be flat with no "envelopes" manifesting the modulation caused by the eccentricity. Moreover, the whole-track amplitude will increase (in the track-data regions) and decrease (in the guardband regions) monotonically as a whole as one steps the head across in the radial direction.

The second approach of track demodulation focuses on "track-following". This is accomplished by programming the head actuator of the spin-stand to follow the curve of the modulated track in the radial direction. The curve describing the modulated track can be rewritten as:

$$m(t) \approx r + \delta \cos(\omega t + \Phi_0) \quad (7)$$

where $\omega$ is the angular frequency of the spindle and $\Phi_0$ is the initial phase of the modulated track. Since $\delta$ can be calculated from equation (4) and ω is a known value, the initial phase $\Phi_0$ can be determined by adaptively tuning the delay of the head actuator movement until the head is precisely following the modulated track as set forth in equation (7). The best result of track demodulation is obtained when the two approaches are used in combination. In other words, track-centering is first used to reduce the value of δ, then the head actuator can be programmed for track-following of the imaged track.

Figure 4:
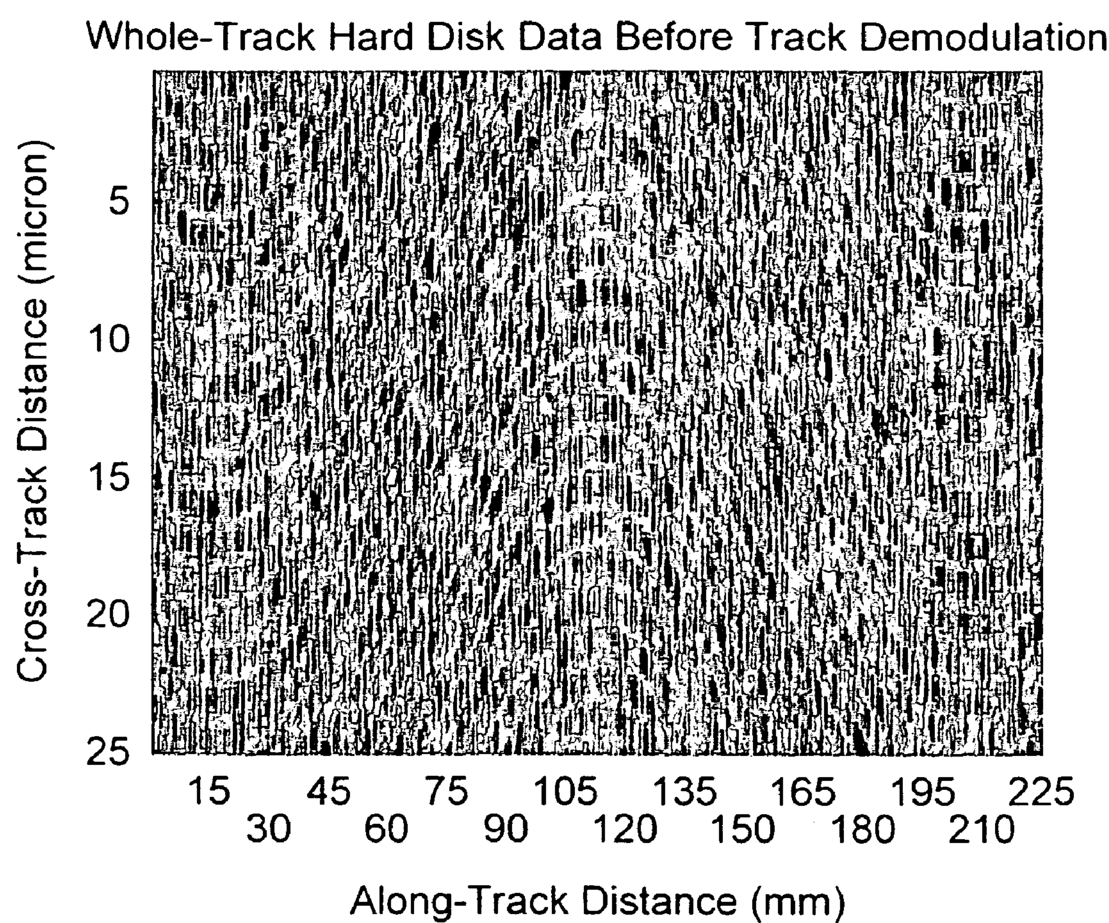
FIG. 4 shows the spin-stand image of whole-track hard disk data before track demodulation.

FIG. 4 is a spin-stand image showing the whole-track hard disk data (from around 15 mm to 210 mm in the along-track distance) from an off-centered disk. As is evident, the curves of the whole-track data are sinusoidally modulated in the cross-track direction due to track eccentricity. The δ, being one half of the peak-to-peak amplitude (in distance) of the modulated track, is calculated from the figure to be about 10 μm. When no effort was made to center the disk, the value of δ could be significantly higher (tens of microns or more).

Figure 5:
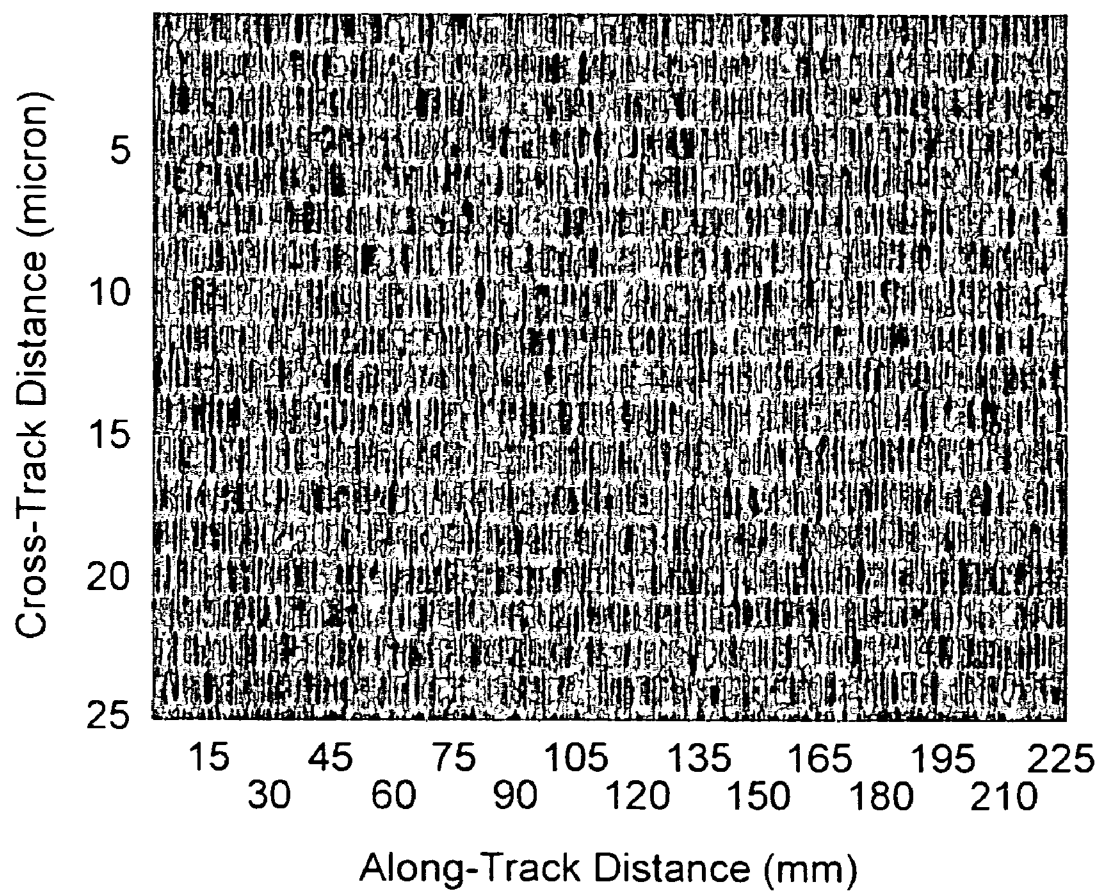
FIG. 5 shows the spin-stand image of whole-track hard disk data after track demodulation.

FIG. 5 shows the spin-stand image of the whole-track hard disk data of the same disk after the tracks have been properly demodulated. These demodulated tracks still contain a little remnant modulation because the written tracks were not perfectly circular in the first place. This small degree of residual modulation, however, does not impede the utility of the whole-track imaging technique for the analysis of track and servo writing. Different data regions along the tracks, such as the servo fields, the track-id fields, and the timing recovery fields can be readily extracted from these whole-track images for evaluation and analysis. Any defects along the tracks and across the disk surface can also be rapidly spotted using this technique, which can be programmed to efficiently perform such a surface scan.

The technique of whole-track spin-stand imaging of hard disk data from off-centered disks also opens the path for in-situ drive centering and imaging. This has significant implications for hard disk data recovery in situations when, for example, the hard drive spindle suffers from irreparable damage that deems a replacement necessary. Through suitable modifications to the technique described in this paper, the data residing in any such off-centered disk mounted on the new spindle can be recovered after the proper track demodulation.

III. Triggering and Numerical Alignment Technique of Spin-Stand Imaging

The collected scanned images generated by head 40 and universal head pre-amplification board 50 can be quite distorted if a stable triggering mechanism is not available to always image the same target area of the disk 30. In order to provide a reasonably stable trigger, a drive index of the spindle 20 is established as an external trigger to oscilloscope 60. This drive index of the spindle 20 is generated by the drive electronics of the spin-stand 12 for each complete revolution of the spindle 20. However, due to the small variations of the rotational speed of the spindle motor, this drive index is not stable enough to the extent that the collected images are undistorted.

As a result of this instability of the trigger, additional numerical aligning of the scanned images is required in order to offset any resultant image shift. This alignment algorithm is performed by software contained in computer or processing means 90 such that successive along-track voltages are compared with their next adjacent along-track voltages in the cross-track direction. Specifically, cross-correlations between successive along-track voltages are computed. The along-track voltages are then shifted in the along-track direction by an amount such that the cross-correlation between successive along-track voltages is a maximum. The essence of this aligning technique is thus the shifting of the resultant raw images based on the successive minimization of the inner dot products between data of adjacent tracks.

As an illustration of the alignment procedure, we assume that a total of N discrete steps of along-track voltages in the cross-track direction are collected. If line number 1 is the first along-track voltage measurement, then line 2 (which is one radial step from line 1) is shifted with respect to line 1 by an amount such that their cross-correlation is a maximum. Subsequent, line 3 (which is one radial step from line 2) is shifted with respect to line 2 such that their cross-correlation is also a maximum. The process continues until all the lines have been shifted; i.e., line N has been shifted with respect to line N−1.

Assuming that the scanned data is already put into a two-dimensional array called scan_data, with $N_x$ rows and $N_y$ columns, where $N_x$ and $N_y$ are the number of points in the along-track and cross-track directions, respectively. We further assume that the aligned data is going to be put into a two-dimensional array called align_data. Using a "*" to represent all the points in a particular dimension of an array, the algorithm is as follows:

```
For j=1 to Ny−1 Begin
    a) Compute the cross-correlation of scan_data(*,j) and
       scan_data(*,j+1)
    b) Find the position shift required (in terms of the number
       of points) in the along-track direction that corresponds to
       the maximum value of the computed cross-correlation.
    c) Put the found position into a 1D-array called scan_shift;
       i.e., scan_shift(j) = the found position
End
    d) Compute cut where cut is the maximum value of the 1D-
array scan_shift
    e) Initialize the 2D-array align_data where align_data =
scan_data(cut+1:Nx−cut,*)
For j=2 to Ny Begin
    f) align_data(*,j) = scan_data(cut + 1 + scan_shift(j): Nx−
cut + scan_shift(j),j)
End
```

The aligned data is now stored in the two-dimensional array align_data.

Figure 6:
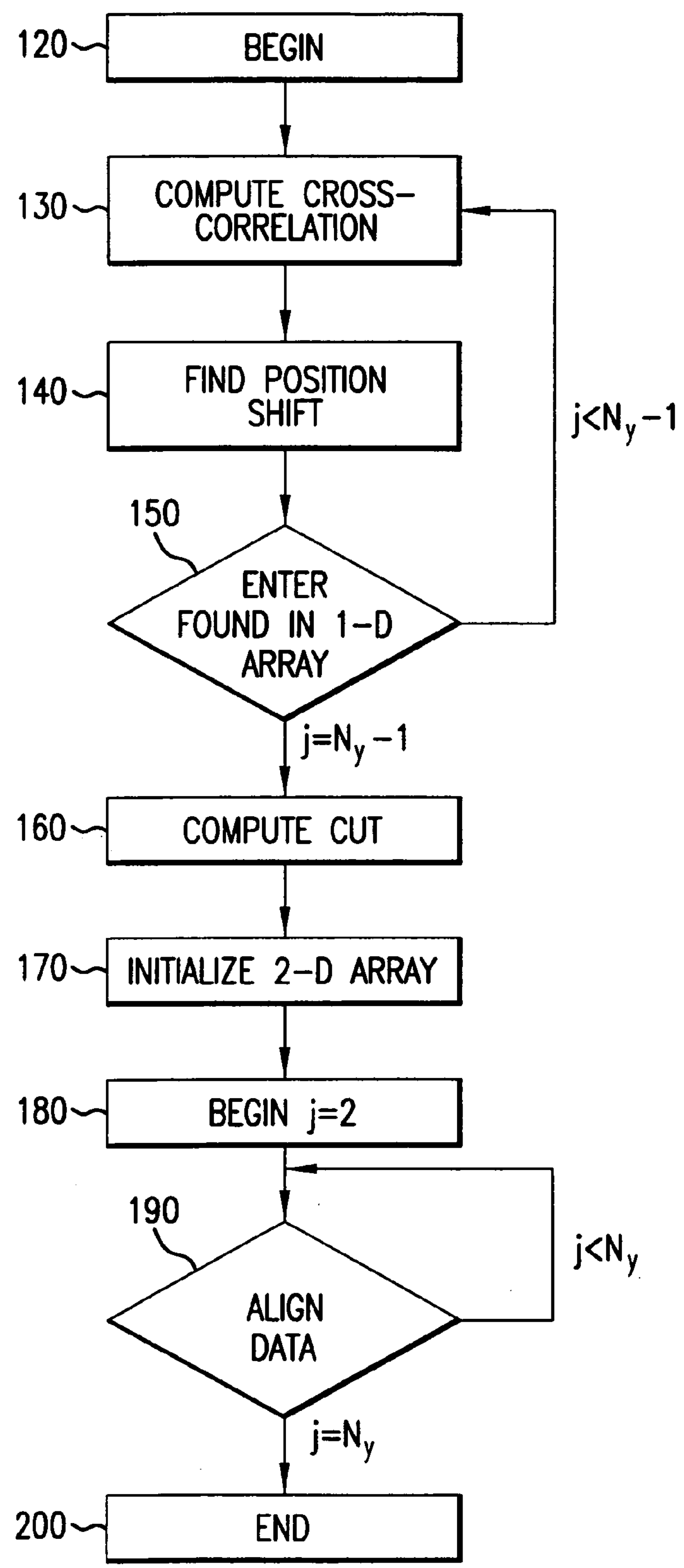
FIG. 6 is a flow diagram of the magnetic read data alignment algorithm.

As shown in the flow diagram of FIG. 6, at step 120, the algorithm begins with j set to 1. At step 130, the cross-correlation between scan_data(*,j) and scan-data(*,j+1) is computed. At step 140, the position shift required (in terms of the number of points) is found in the along-track direction. This corresponds to the maximum value of the computed cross-correlation, found in step 130. At step 150, the found position is placed into a one-dimensional array called scan_shift. For j, scan_shift(j) is equal to the found position. If $j=N_y-1$, then the algorithm passes to step 160. If, however, $j<N_y-1$, then the algorithm passes back to step 130 to repeat.

At step 160, cut is computed, where cut is the maximum value of the one-dimensional array scan_shift. At step 170, a two-dimensional array is initialized. This array is called align_data where align_data=scan_data (cut+1: $N_x$−cut,*).

Following the initialization in step 170, the value of j is then set equal to 2 at step 180. At step 190, the value of align_data (*,j) is computed. If $j=N_y$, then the array is completely filled and at step 200, the algorithm ends. However, if $j<N_y$, then the algorithm stays on step 190 to repeat.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, proportional quantities of the elements shown and described may be varied, and in the method steps described, particular steps may be reversed or interposed, all without departing from the spirit or scope of the invention as defined in the appended Claims.

What is claimed is:

1. A method for high-speed massive magnetic imaging on a spin-stand comprising the steps of:

(a) establishing a hard disk mounted on a spindle of a spin-stand;

(b) establishing position and orientation of said hard disk through a track-centering and track-following procedure to account for eccentricity of said hard disk with respect to the center of rotation of said spindle;

(c) measuring data from said hard disk with a magnetic read head responsive to a triggering signal;

(d) maintaining alignment of said magnetic read head whereby said magnetic read head is positionally located to be driven to a preselected orientation with respect to said hard disk;

(e) establishing numerical alignment of said data to account for instability of said triggering signal and said spindle of the spin-stand; and, (f) returning to step (e) prior to a completion of reading said data from said hard disk.

2. The method for high-speed massive magnetic imaging on a spin-stand as recited in claim 1 wherein said track-centering and track-following procedure includes the step of measuring skew angles of individual tracks of said hard disk.

3. The method for high-speed massive magnetic imaging on a spin-stand as recited in claim 2 wherein said skew angles are imaged on an oscilloscope.

4. The method for high-speed massive magnetic imaging on a spin-stand as recited in claim 3 wherein said step (b) includes mechanical adjustment of said hard disk and said spindle responsive to image data displayed on said oscilloscope.

5. The method for high-speed massive magnetic imaging on a spin-stand as recited in claim 3 wherein skew angle images include numerical shifting of skew angle data displayed on said oscilloscope.

6. The method for high-speed massive magnetic imaging on a spin-stand as recited in claim 1 wherein said step of measuring data includes the step of establishing a drive index of said spindle, said drive index being a measure of each complete revolution of said hard disk.

7. The method for high-speed massive magnetic imaging on a spin-stand as recited in claim 6 wherein said triggering signal is generated responsive to said drive index.

8. The method for high-speed massive magnetic imaging on a spin-stand as recited in claim 1 wherein said step (e) includes the step of measuring a first set of voltages corresponding to successive measurements of a first set of tracks of said hard disk measured in a circumferential direction.

9. The method for high-speed massive magnetic imaging on a spin-stand as recited in claim 8 wherein step (e) includes the step of measuring a second set of voltages corresponding to successive measurements of a second set of tracks of said hard disk measured in a circumferential direction, said first set of tracks and said second set of tracks being radially positioned adjacent each with respect to the other.

10. The method for high-speed massive magnetic imaging on a spin-stand as recited in claim 9 wherein step (e) includes said first set of voltages being cross-correlated with said second set of voltages.

11. The method for high-speed massive magnetic imaging on a spin-stand as recited in claim 10 wherein step (e) includes the step of shifting said first set of voltages in said circumferential direction such that said cross-correlation is maximized.

12. The method for high-speed massive magnetic imaging on a spin-stand as recited in claim 1 wherein the step of track-centering includes micro-positioning of said hard disk such that the written track center of said hard disk is brought into alignment with the reading track center of said magnetic read head.

13. The method for high-speed massive magnetic imaging on a spin-stand as recited in claim 1 wherein the track-following procedure includes programming a head actuator of said spin-stand to follow the curve of a modulated track in a radial direction.

14. A system for high-speed massive magnetic imaging on a spin-stand comprising:

a spin-stand having a rotationally driven spindle projecting therefrom;

a magnetic hard disk mounted on said spindle;

a magnetic read head mounted on said spin-stand for reading data stored on said magnetic hard disk;

an oscilloscope for displaying read-back voltages generated by said magnetic read head, said oscilloscope being electrically coupled to said magnetic read head; and, processor means electrically coupled to said oscilloscope for storing and translating data signals generated by said magnetic read head said processor means compares measurements of adjacent sets of tracks of said hard disk to calibrate said data signals and adjust said data signals for skew angle deviation.

15. The system for high-speed massive magnetic imaging on a spin-stand as recited in claim 14 wherein said spin-stand includes adjustable securement means for securing said magnetic hard disk to said spindle.

16. The system for high-speed massive magnetic imaging on a spin-stand as recited in claim 14 wherein said oscilloscope displays skew angle data of tracks of said magnetic hard disk.

17. The system for high-speed massive magnetic imaging on a spin-stand as recited in claim 16 wherein said processor means receives said skew angle data and adjusts said data signals to compensate for skew angle deviation.

18. The system for high-speed massive magnetic imaging on a spin-stand as recited in claim 16 further comprising counting means for generation of a drive index which updates incrementally with each full revolution of said spindle.

19. The system for high-speed massive magnetic imaging on a spin-stand as recited in claim 18 wherein measurements of said magnetic read head are made responsive to a triggering signal based upon said drive index.

20. The system for high-speed massive magnetic imaging on a spin-stand as recited in claim 14 further comprising display means for displaying scanned image data, said display means being in electrical communication with said processor means.

21. The system for high-speed massive magnetic imaging on a spin-stand as recited in claim 14 further comprising a universal head preamplification board mounted on said spin-stand for producing said read-back voltages responsive to initial signals generated by said magnetic read head.

* * * * *